United States Patent [19]

Kawanishi et al.

[11] Patent Number: 5,492,794
[45] Date of Patent: Feb. 20, 1996

[54] INFORMATION RECORDING MEDIUM

[75] Inventors: Yoshitaka Kawanishi; Tatsunori Ide, both of Tokyo, Japan

[73] Assignee: NEC Corporation, Tokyo, Japan

[21] Appl. No.: 360,561

[22] Filed: Dec. 21, 1994

[30] Foreign Application Priority Data

Dec. 27, 1993 [JP] Japan .................................. 5-331413

[51] Int. Cl.⁶ ................................................. G11B 7/24
[52] U.S. Cl. ...................... 430/273.1; 430/945; 369/288; 428/64.4; 428/64.5
[58] Field of Search ................................ 430/273, 271, 430/270, 495, 945, 19; 369/288; 428/64.4, 64.5

[56] References Cited

U.S. PATENT DOCUMENTS

| | | | |
|---|---|---|---|
| 4,866,672 | 9/1989 | Terao et al. | 365/151 |
| 4,954,379 | 9/1990 | Nishida et al. | 428/64 |
| 5,234,737 | 10/1993 | Ueno et al. | 428/64 |

FOREIGN PATENT DOCUMENTS

| | | |
|---|---|---|
| 2-112987 | 4/1990 | Japan . |
| 4223191 | 8/1992 | Japan . |

OTHER PUBLICATIONS

*Crystalization Kinetics in $Ge_2Sb_2Te_5$ Phase–change Recording Films,* Ozawa et al., Fuji Electric Corporate Research and Development Ltd., TuA4–1–TuA4–4/99.

Primary Examiner—Charles L. Bowers, Jr.
Assistant Examiner—John A. McPherson
Attorney, Agent, or Firm—Sughrue, Mion, Zinn, Macpeak & Seas

[57] ABSTRACT

An information recording medium includes a recording thin film formed on a substrate. The recording thin film consists of a material containing cobalt, antimony, and tellurium as main components, and an energy beam is irradiated on the recording thin film to change optical characteristics of the recording thin film, thereby recording information.

9 Claims, 7 Drawing Sheets

INFORMATION RECORDING MEDIUM

BACKGROUND OF THE INVENTION

The present invention relates to an information recording medium and, more particularly, to an information recording medium in which digital information such as computer data or a digital audio signal can be recorded in real time with a recording energy beam such as a laser beam or an electron beam.

As such an information recording medium, a recording medium in which information is recorded using a difference between the reflectances of an amorphous phase and a crystalline phase with respect to a laser beam is used. For example, when a laser beam is irradiated on a recording thin film whose initial state is a crystalline state, the irradiated portion is rapidly heated and cooled, and the state of the irradiated portion is changed into an amorphous state, thereby forming a mark which is different from a non-irradiated portion in reflectance. In addition, when a laser beam weaker than that used in the recording operation is irradiated on the mark formed in the recording medium, this irradiated portion is moderately heated and cooled, and the amorphous state of the mark formed portion is returned to the crystalline state which is the initial state.

As the material of such a recording thin film in which phase transition between an amorphous phase and a crystalline phase can be reversibly performed, in other words, a recording thin film in which a recording operation and an erasing operation can be reversibly performed, an alloy consisting of Sb and Te or an alloy consisting of Ge, Sb, and Te and obtained by improving the characteristics of the alloy consisting of Sb and Te is known.

Although the alloy consisting of Sb and Te is crystallized within a short time, the amorphous state of the alloy is not satisfactorily stable. In the alloy consisting of Ge, Sb, and Te, the component ratio of Ge must be set to be 10% or more to obtain a satisfactorily stable amorphous state. However, in this case, a long time is required to crystallize the alloy. In addition, with the progress of an information-oriented society, a higher transmission speed of information and better durability for holding recorded information are demanded. However, as a temperature at which an amorphous phase is changed into a crystalline phase is higher, the durability for holding recorded information in the recording thin film described above becomes better. However, the alloy consisting of Sb and Te and the alloy consisting of Ge, Sb, and Te pose the above problems, and do not completely satisfy the above demands.

SUMMARY OF THE INVENTION

It is, therefore, a principal object of the present invention to provide an information recording medium capable of improving stability of an amorphous phase without prolonging a crystallization time.

In order to achieve the above object, according to an aspect of the present invention, there is provided an information recording medium comprising a recording thin film formed on a substrate, wherein the recording thin film consists of a material containing cobalt, antimony, and tellurium as main components, and an energy beam is irradiated on the recording thin film to change optical characteristics of the recording thin film, thereby recording information.

DESCRIPTION OF THE PREFERRED EMBODIMENT

Figure 1:
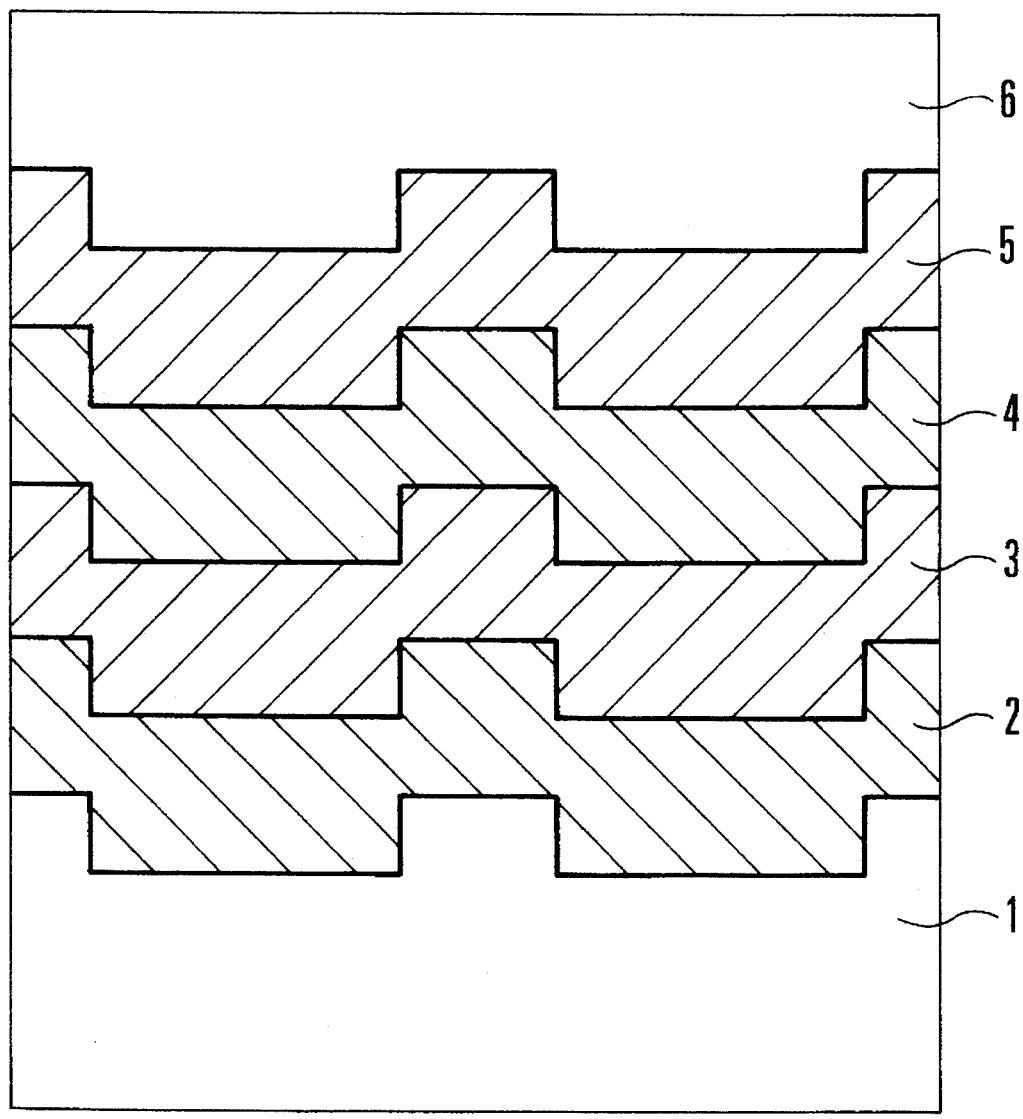
FIG. 1 is a sectional view showing the arrangement of an information recording medium according to an embodiment of the present invention.

The present invention will be generally described below before an embodiment of the present invention is described.

In a range of "$(Sb_2Te_3)_{1-a}(Co_2Te_3)_a$: $0<a<1$", of a recording thin film according to the present invention, in which a sufficient amount of Te is present, an Sb-Te alloy is crystallized to have the crystal structure of $Sb_2Te_3$, and a Co-Te alloy is crystallized to have a crystal structure almost identical to that of $Co_2Te_3$ having a high standard generation energy.

In this composition range, even if Co is added to the Sb-Te alloy, its crystal structure rarely changes.

As described above, in the range in which a sufficient amount of Te is present, although a distortion is caused due to the size difference between a Co atom and an Sb atom, this distortion functions as crystalline nuclei. The crystalline nuclei cause an increase in crystallization temperature, and an increase in crystallization rate when crystallization is started.

In addition, since the above standard generation energy is high, an activation energy also becomes high.

In this manner, when Co atoms are added, crystallization does not easily occur because of both the functions, i.e., the increase in crystallization rate due to the distortion serving as nuclei and the high standard generation energy. However, when crystallization begins once, the crystallization progresses at a high rate.

More specifically, the stability of an amorphous state is considerably improved. On the other hand, in causing crystallization to occur, when the crystallization begins once, the crystallization progresses at a high rate (is quickly finished).

In other words, considering the above film as a recording medium, an amorphous state corresponding to a state wherein data is recorded is very stable. When data is to be written, the amorphous state can be quickly changed into a crystalline state corresponding to a state wherein data is not recorded. For this reason, data can be rewritten at a high speed.

Therefore, in a range in which a sufficient amount of Te is present, the film is suitable as a recording medium whose crystallization rate is high.

In a range of "$(Sb_2Te_3)_{1-b}Co_b$): $0<b<1$" in which a small amount of Te is present, since Co deprives $Sb_2Te_3$ of Te, Sb is excessively generated, thereby decreasing a crystallization rate.

On the other hand, Co is combined with excessive Sb to form a crystal structure of $SbCo_3$ or the like. For this reason, a structural factor is made large, and a crystallization temperature is increased, thereby improving the stability of an amorphous state.

Therefore, in the range in which a small amount of Te is present, although the stability of the amorphous state is considerably improved as in the case described above, the film is suitable as a recording medium whose crystallization rate is low.

In this case, the recording medium is used as a disk-like recording medium, and recording/erasing operations for the disk-like recording medium are performed by irradiating a laser beam on the recording medium while the recording medium is rotated.

In rotating the recording medium at a high speed, when data is to be written in the recording medium, i.e., when a laser beam having a high intensity is to be irradiated on the recording medium, a portion irradiated with the laser beam is immediately away from a region on which the laser beam is being irradiated. This portion is rapidly cooled.

For this reason, in this case, a recording medium having a high crystallization rate and a range in which a sufficient amount of Te is present is suitable.

In rotating a recording medium at a low speed, when data is to be written in the recording medium, a region in which the data is to be written is irradiated with a laser beam for a time longer than that of the above case. As a result, the irradiation state of the laser beam is gradually attenuated.

The portion irradiated with the laser beam is not rapidly cooled. For this reason, when a recording medium having a high crystallization rate and a range in which a sufficient amount of Te is present is used, the state of the portion may not become an amorphous state.

For this reason, in this case, a recording medium having a low crystallization rate and a range in which a small amount of Te is present is preferably used.

Note that a Co element facilitates absorption of a long-wavelength beam such as a semiconductor laser beam, thereby increasing a recording sensitivity.

The present invention has a characteristic feature in which the average composition of a recording thin film in a film direction is represented by $Co_xSb_yTe_zA_pB_qC_r$.

In this case, although the average composition of the recording thin film in the film direction may be changed within the predetermined range described above, a continuous change in composition is preferably performed.

As the element constituting the recording thin film and represented by reference symbol A, particularly, Si or Mn is preferably used, and secondly, Pb, Cu, Ag, Pt, Au, or Al is preferably used.

Thirdly, Ti, V, Cr, Fe, Ni, or Zn is preferably used, and, fourthly, S or Se is preferably used.

As the element represented by reference symbol B, particularly, Bi or Tl is preferably used, and secondly, Ba, Ga, In, Pb, or I is preferably used, and thirdly, As is preferably used.

As the element represented by reference symbol C, particularly, nitrogen is preferably used.

In addition to the above, elements "A", "B" and "C" can be any of the following as described:

Reference symbols x, y, z, p, q, and r respectively represent atomic percentages and are defined as follows: $0<x\leq50$, $0<y\leq65$, $10\leq z\leq70$, $0\leq p\leq30$, $0\leq q\leq30$, and $0\leq r\leq30$. Reference symbol "A" represents at least one element selected from the group consisting of beryllium (Be), magnesium (Mg), calcium (Ca), scandium (Sc), yttrium (Y), titanium (Ti), vanadium (V), chromium (Cr), manganese (Mn), iron (Fe), nickel (Ni), copper (Cu), zinc (Zn), strontium (Sr), zirconium (Zr), niobium (Nb), molybdenum (Mo), technetium (Tc), ruthenium (Ru), rhodium (Rh), lead (Pb), silver (Ag), cadmium (Cd), lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), lutetium (Lu), hafnium (Hf), tantalum (Ta), tungsten (W), rhenium (Re), osmium (Os), iridium (Ir), platinum (Pt), gold (Au), aluminum (Al), sulfur (S), and selenium (Se).

Reference symbol "B" represents at least one element selected from the group consisting of sodium (Na), potassium (K), rubidium (Rb), cesium (Cs), barium (Ba), mercury (Hg), gallium (Ga), indium (In), thallium (Tl), arsenic (As), tin (Sn), lead (Pb), bismuth (Bi), fluorine (F), chlorine (Cl), bromine (Br), and iodine (I). Reference symbol "C" represents at least one element selected from the group consisting of boron (B), carbon (C), nitrogen (N), and oxygen (O).

The recording thin film according to the present invention preferably airtightly adheres to at least a material other than that of the recording thin film to protect the recording thin film. In addition, both the surfaces of the substrate are more preferably protected.

A dielectric film for protecting such a recording thin film may consist of the same material as that of the substrate or a base (tape or the like), or an organic material such as an acrylic resin or polycarbonate. In addition, the dielectric film may consist of an oxide, a nitride, a sulfide, a selenide, a fluoride, or an inorganic material containing a metal or the like as a main component.

A substrate containing, as a main component, glass, quartz, sapphire, iron, or aluminum can also serve as an inorganic protective dielectric film on the substrate surface of the recording thin film.

Of organic and inorganic materials serving as the materials for the protective film, the inorganic material is preferably used as the material airtightly adhering to the recording thin film because the inorganic material has a high heat resistance. However, the inorganic film serving as the protective dielectric film on the surface of the recording thin film is increased in thickness, formation of cracks, a decrease in transmittance, and a decrease in sensitivity tend to occur.

For this reason, as the protective film on the surface of the recording thin film, a thick organic film is preferably used. The mechanical strength of the recording thin film can also be increased. In addition, the substrate may consist of an organic material.

When both of the substrate and the protective film for protecting the surface of the recording thin film formed on the substrate consist of an organic material, the substrate and the protective film are rarely deformed. As the organic material, for example, an acrylic resin or polycarbonate is known. In addition, an ultraviolet-curing resin or the like may be used.

When a protective dielectric film consisting of the above inorganic material is to be used, this film is formed by electron beam deposition, sputtering, reactive sputtering, or the like.

As the material of the inorganic protective dielectric film described above, an oxide of at least one element of Ce, La, Si, In, Al, Ge, Pb, Sn, Bi, Te, Ta, Sc, Y, Ti, Zr, V, Nb, Cr, and W or a sulfide of at least one element of Cd, Zn, Ga, In, Sb, Ge, Sn, and Pb is used.

A selenide, a fluoride of Mg, Ce, or Ca, a boride of Ti or the like, a carbide of boron or the like, or a material containing boron or carbon may be used. For example, a material containing a main component having a composition similar to one of $CeO_2$, $La_2O_3$, $SiO$, $SiO_2$, $In_2O_3$, $Al_2O_3$, $GeO$, $GeO_2$, $PbO$, $SnO$, $SnO_2$, $Bi_2O_3$, $TeO_2$, $WO_2$, $WO_3$, $Ta_2O_5$, $Sc_2O_3$, $Y_2O_3$, $TiO_2$, $ZrO_2$, $CdS$, $ZnS$, $CdSe$, $ZnSe$, $In_2S_3$, $In_2Se_3$, $Sb_2S_3$, $Sb_2Se_3$, $Ga_2S_3$, $Ga_2Se_3$, $MgF$, $CeF_2$, $CeF_3$, $CaF_2$, $GeS$, $GeSe$, $GeSe_2$, $SnS$, $SnSe$, $PbS$, $PbSe$, $Bi_2S_3$, $Bi_2Se_3$, $TaN$, $Si_3N_4$, $AlN$, $Si$, $TiB_2$, $B_4C$, $B$, and $C$, or a composite material such as $ZnS$-$SiO_2$ is used.

Of the above materials, particularly, $ZnS$-$SiO_2$ is preferably used.

When a beam is generally irradiated on a thin film, beams reflected by the thin film interfere with each other because the beam reflected by the upper surface of the thin film overlaps the beam reflected by the lower surface of the thin film.

When a signal to be read using a change in reflectance, a light-reflecting (absorbing) layer is formed near the recording thin film. In this manner, the interference effect can be enhanced, and the readout signal can be increased.

In order to enhance the interference effect, an intermediate layer is preferably formed between the recording thin film and the reflecting (absorbing) film.

The intermediate layer also has an effect of preventing diffusion between the recording thin film and the reflecting layer in a recording/rewriting operation.

In addition, the recording thin film according to the present invention may be formed such that diffusion is performed by codeposition, cosputtering, or the like in an oxide, a fluoride, a nitride, or an organic material which can be used as the material of the protective film.

In this manner, a light absorbing coefficient can often be adjusted, and a reproduced signal intensity can often be increased.

Note that, in the recording thin film according to the present invention, a change between an amorphous state and a crystalline state is not necessarily used in a recording operation. The following changes may be used in a recording operation. For example, optical characteristics are changed by any change in atom arrangement such as a change in degree of crystallinity, a change in crystal system, or a change in crystal grain size, or a photon mode is changed by changing the energy level of electrons.

In addition, the recording thin film is not limited to a disk-like recording thin film, and a tape- or card-like recording thin film may be formed.

In an information recording medium constituted by the recording thin film arranged as described above, the crystallization rate of the recording thin film can be freely adjusted, and the recording thin film has the following advantages: high stability of an amorphous state; a large amount of absorbed semiconductor laser beam; a high intensity of a generated signal; and a high environmental resistance.

In other words, the information recording medium constituted by the recording thin film has good recording/erasing characteristics, a high sensitivity, and a stable recorded state.

The present invention, as described above, has a characteristic feature in which the average composition of the recording thin film in the film direction is represented by $Co_xSb_yTe_zA_pB_qC_r$.

In a material containing Te, the added A-group element moves as a molecular form rather than in a chain-like atomic configuration of Te. For this reason, a crystallization rate increases, and an amorphous state becomes stable.

In addition, adding the A-group element increases a viscosity coefficient and decreases the fluidity of the information recording medium, thereby improving the repetition characteristics of recording, reproducing, and erasing operations.

Of the B-group element in the average composition represented by $Co_xSb_yTe_zA_pB_qC_r$, a halogen such as Cl or I or an alkaline metal element such as Na or K cuts a chain-like atomic configuration of Te in the material containing Te.

For this reason, adding the B-group element increases a crystallization rate.

In addition, the element (B-group element) combined with Te has a relatively low melting point. For this reason, a crystallization temperature becomes low.

When the B-group element other than the halogens and alkaline metal elements described above is combined with Te, the melting point of the B-group element becomes low, and the B-group element generates small heat of fusion. For this reason, a crystallization temperature of the recording thin film becomes low, and the recording thin film can be easily rapidly heated and cooled. Adding the B-group element improves the repetition characteristics of recording, reproducing, and erasing operations.

Of the C-group element in the average composition represented by $Co_xSb_yTe_zA_pB_qC_r$, boron (B) or carbon (C)

is not melted when a laser beam is irradiated on the recording thin film. For this reason, the C-group element functions to increase the viscosity of the recording medium and decrease the mobility of diffusion of the remaining elements constituting the recording medium, thereby improving the repetition characteristics of recording and reproducing operations.

In addition, when Co, Sb, and Te of the C-group elements, and a nitride or oxide of at least one of Co, Sb, and Te constitute a matrix, the recording thin film can be prevented from flowing.

In this manner, when heating and cooling operations are repeated with repetition of the recording, reproducing, and erasing operations, a phenomenon in which the recording medium material is pulsated and moves along a guide groove can be suppressed, thereby improving the repetition characteristics of recording and erasing operations.

In addition to the above, elements "A", "B" and "C" can be any of the following as described:

Reference symbols x, y, z, p, q, and r respectively represent atomic percentages and are defined as follows: $0<x\leq50$, $0<y\leq65$, $10\leq z\leq70$, $0\leq p\leq30$, $0\leq q\leq30$, and $0\leq r\leq30$. Reference symbol "A" represents at least one element selected from the group consisting of beryllium (Be), magnesium (Mg), calcium (Ca), scandium (Sc), yttrium (Y), titanium (Ti), vanadium (V), chromium (Cr), manganese (Mn), iron (Fe), nickel (Ni), copper (Cu), zinc (Zn), strontium (Sr), zirconium (Zr), niobium (Nb), molybdenum (Mo), technetium (Tc), ruthenium (Ru), rhodium (Rh), lead (Pb), silver (Ag), cadmium (Cd), lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tin), ytterbium (Yb), lutetium (Lu), hafnium (Hf), tantalum (Ta), tungsten (W), rhenium (Re), osmium (Os), iridium (Ir), platinum (Pt), gold (Au), aluminum (Al), sulfur (S), and selenium (Se).

Reference symbol "B" represents at least one element selected from the group consisting of sodium (Na), potassium (K), rubidium (Rb), cesium (Cs), barium (Ba), mercury (Hg), gallium (Ga), indium (In), thallium (Tl), arsenic (As), tin (Sn), lead (Pb), bismuth (Bi), fluorine (F), chlorine (Cl), bromine (Br), and iodine (I). Reference symbol "C" represents at least one element selected from the group consisting of boron (B), carbon (C), nitrogen (N) and oxygen (O).

An embodiment of the present invention will be described below with reference to the accompanying drawings.

FIG. 1 shows the arrangement of an information recording medium according to an embodiment of the present invention.

Referring to FIG. 1, reference numeral 1 denotes a transparent substrate consisting of polycarbonate and having a thickness of 1.2 mm; 2, a transparent dielectric film consisting of ZnS-SiO$_2$ and having a thickness of 140 nm; 3, a recording thin film consisting of Co$_{0.4}$Sb$_{33.2}$Te$_{58.1}$Ge$_{8.3}$ and having a thickness of 20 nm; 4, a transparent dielectric film consisting of ZnS-SiO$_2$ and having a thickness of 20 nm; 5, a reflecting film consisting of Al and having a thickness of 60 nm; and 6, a protective film consisting of an ultraviolet-curing resin and having a thickness of 10 μm. A light beam is incident from the transparent substrate 1. Note that a projecting portion in FIG. 1 indicates a groove (guide groove) for positioning the light beam incident from the transparent substrate 1.

Figure 2A:
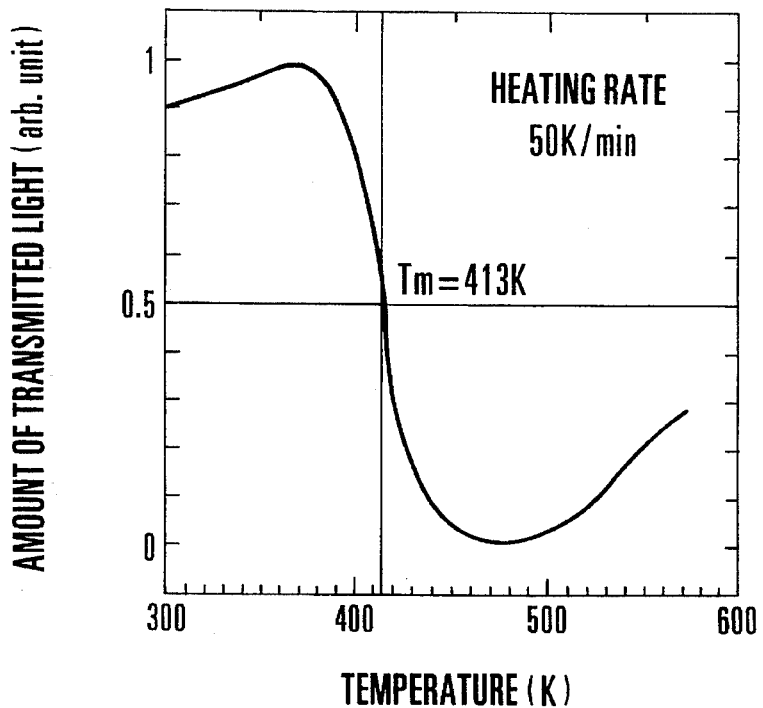
FIGS. 2A and 2B are graphs showing results obtained by measuring an entire crystallization process in which a sample obtained by forming, on a glass substrate, a 20-nm thick recording thin film having a conventional material composition is heated at a constant heating rate.
Figure 2B:
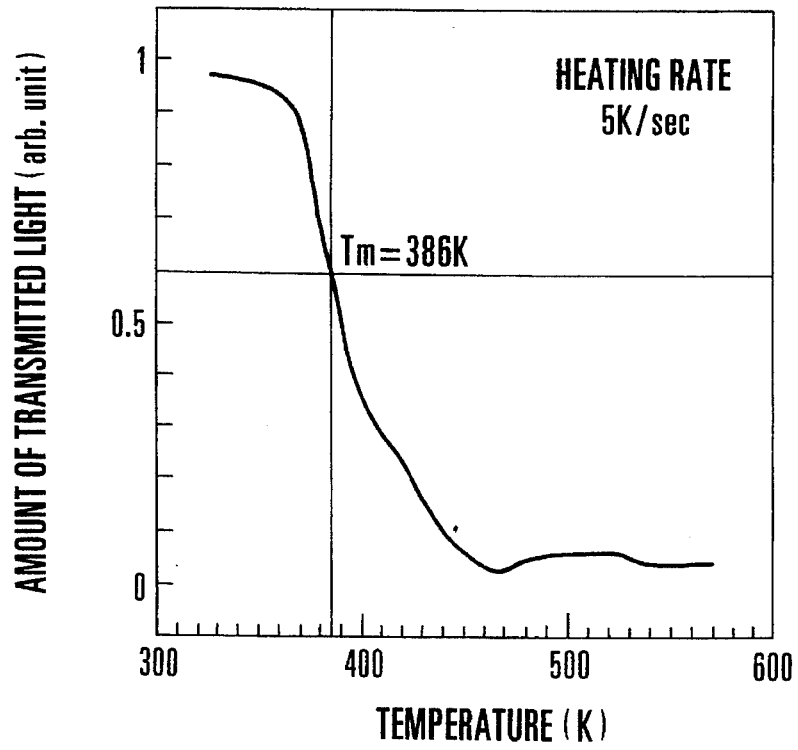

FIGS. 2A and 2B show results obtained by measuring the entire crystallization process in which a sample obtained by forming, on a glass substrate, a 20-nm thick recording thin film having a conventional composition is heated at a constant heating rate.

FIG. 2A shows the crystallization process of Sb$_2$Te$_3$ serving as a recording thin film at a constant heating rate, FIG. 2B is the crystallization process of GeSb$_4$Te$_7$ serving as a recording thin film at a constant heating rate.

As is apparent from FIGS. 2A and 2B, the crystallization temperature Tm of Sb$_2$Te$_3$ is 413K, and the crystallization temperature Tm of GeSb$_4$Te$_7$ is 386K.

FIGS. 3 to 8 show results obtained by measuring the entire crystallization process in which a sample obtained by forming, on a glass substrate, a 20-nm thick recording thin film according to the present invention is heated at a constant heating rate.

Figure 3:
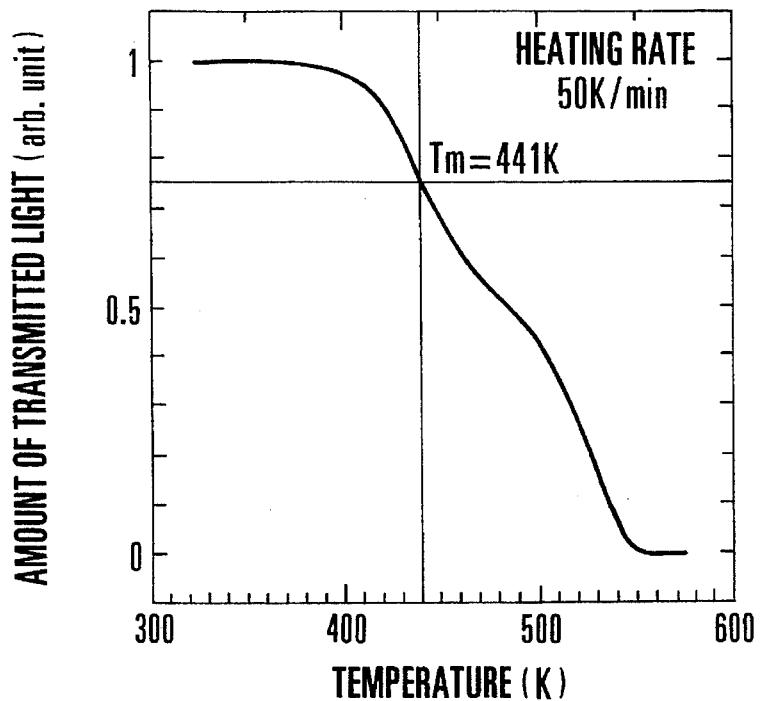
FIG. 3 is a graph showing the temperature dependence of amounts of transmitted light when a recording thin film consisting of a material obtained by adding 4.5 at % of Co to $Sb_2Te_3$ is heated at a constant heating rate of 50 K/min.
Figure 4:
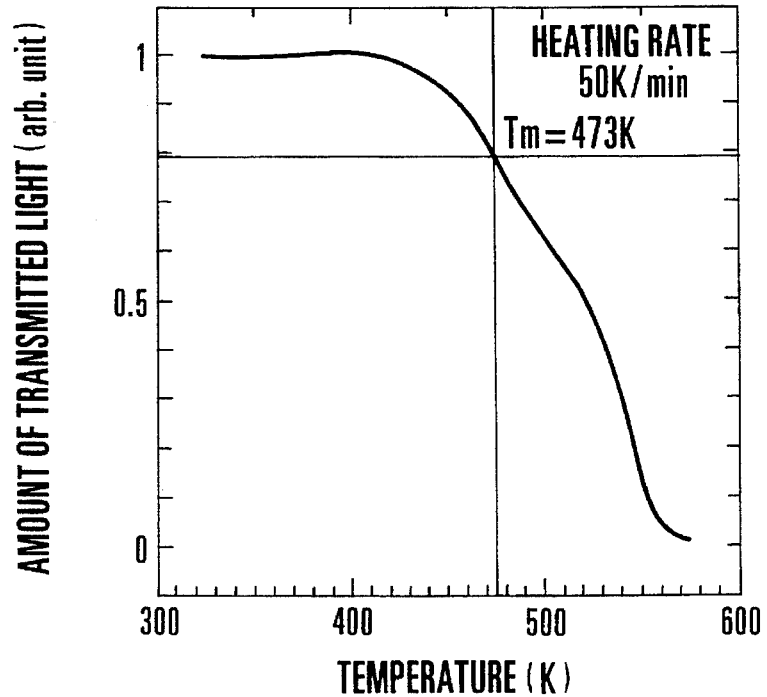
FIG. 4 is a graph showing the temperature dependence of amounts of transmitted light when a recording thin film consisting of a material obtained by adding 7.5 at % of Co to $Sb_2Te_3$ is heated at a constant heating rate of 50 K/min.
Figure 5:
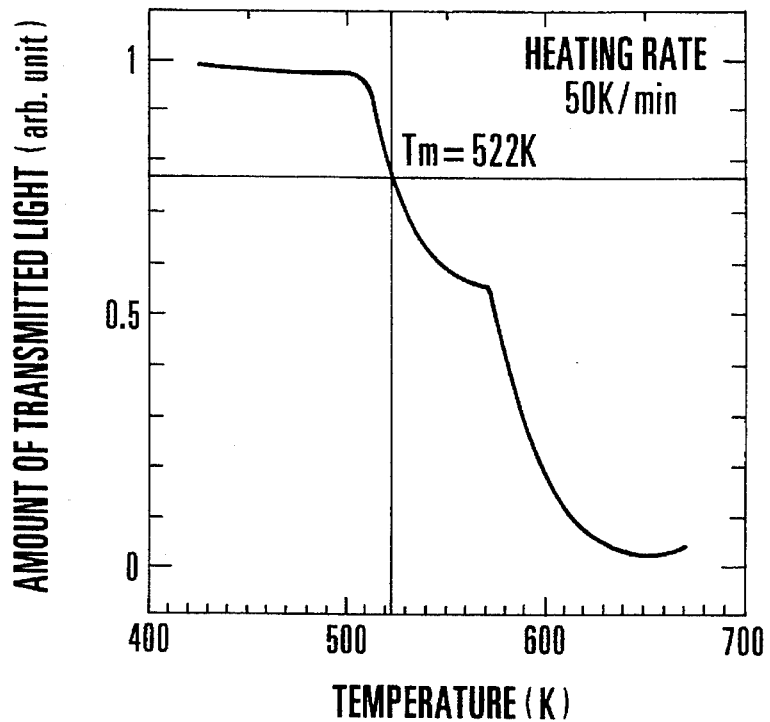
FIG. 5 is a graph showing the temperature dependence of amounts of transmitted light when a recording thin film consisting of a material obtained by adding 15 at % of Co to $Sb_2Te_3$ is heated at a constant heating rate of 50 K/min.

FIGS. 3 to 5 show the dependences of an amount of transmitted light on a temperature when a recording thin film consisting of a material obtained by adding 4.5 at % to 15 at % of Co to Sb$_2$Te$_3$ is heated at a constant heating rate of 50 k/min.

As is apparent from FIGS. 3 to 5, a large change in amount of transmitted light due to a change in temperature represents that the recording thin film can be used as an information recording medium.

A crystallization temperature Tm increases with an increase in Co content. Therefore, it is understood that the recording thin film according to the present invention is stabler than the conventional recording thin film shown in FIG. 2 with respect to heat.

Figure 6:
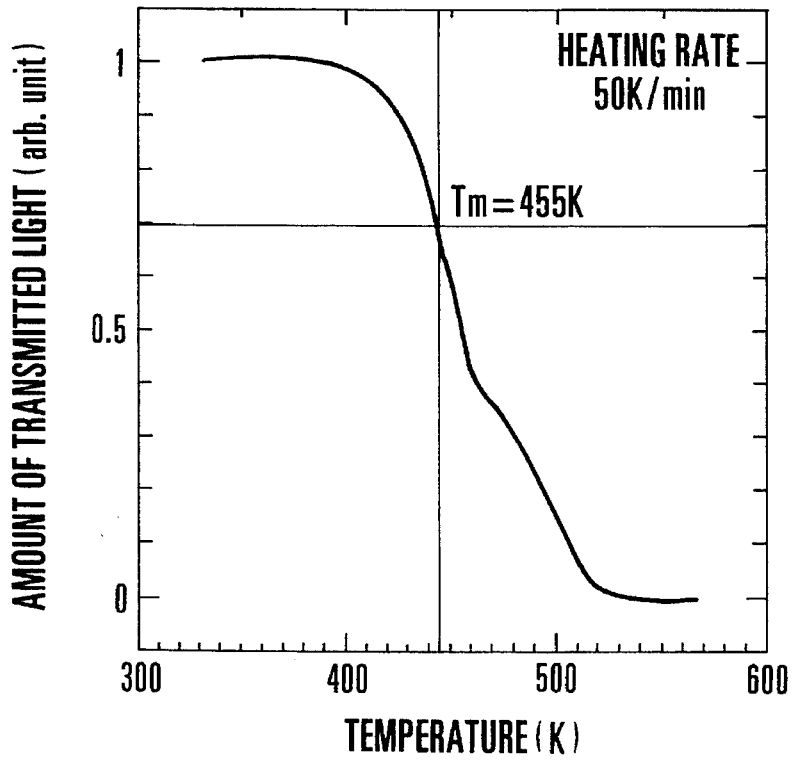
FIG. 6 is a graph showing the temperature dependence of amounts of transmitted light when a recording thin film consisting of a material obtained by adding 10 at % of $Co_2Te_3$ to $Sb_2Te_3$ is heated at a constant heating rate of 50 K/min.
Figure 7:
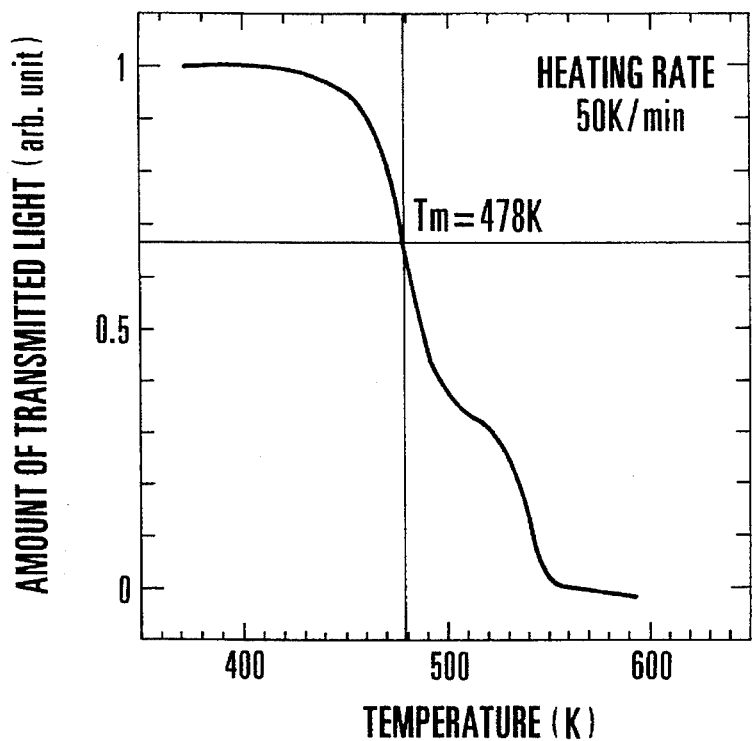
FIG. 7 is a graph showing the temperature dependence of amounts of transmitted light when a recording thin film consisting of a material obtained by adding 20 at % of $Co_2Te_3$ to $Sb_2Te_3$ is heated at a constant heating rate of 50 K/min.
Figure 8:
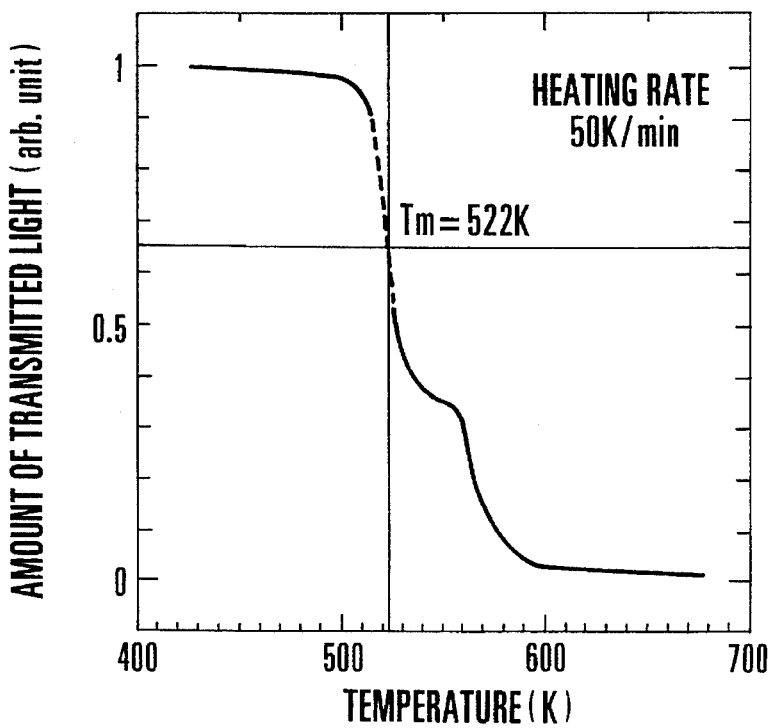
FIG. 8 is a graph showing the temperature dependence of amounts of transmitted light when a recording thin film consisting of a material obtained by adding 30 at % of $Co_2Te_3$ to $Sb_2Te_3$ is heated at a constant heating rate of 50 K/min.

Referring to FIGS. 6 to 8 show the temperature dependences of amounts of transmitted light when a recording thin film consisting of a material obtained by adding 10 at % to 30 at % of Co$_2$Te$_3$ to Sb$_2$Te$_3$ is heated at a constant heating rate of 50 k/min.

As is apparent from FIGS. 6 to 8, a large change in amount of transmitted light due to a change in temperature represents that the recording thin film can be used as an information recording medium.

In this case, a crystallization temperature Tm increases with an increase in Co$_2$Te$_3$ content. Therefore, it is understood that the recording thin film is stable with respect to heat.

Figure 9:
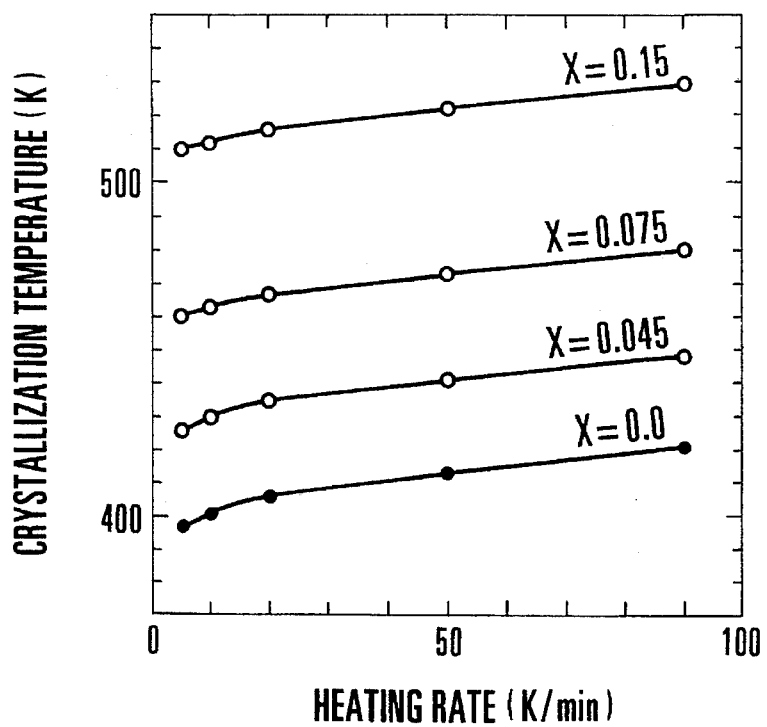
FIG. 9 is a graph showing the correlation between the heating rates and crystallization temperatures of the recording thin films shown in FIGS. 2A and 3 to 5 with respect to a difference in Co content.

FIG. 9 shows the correlation between the heating rates and crystallization temperatures of the recording thin films shown in FIGS. 2A and 3 to 5 with respect to a difference in Co content.

The crystallization temperature greatly increases with an increase in Co content. This indicates that the recording thin film, according to the present invention, to which Co is added has high stability with respect to heat.

Figure 10:
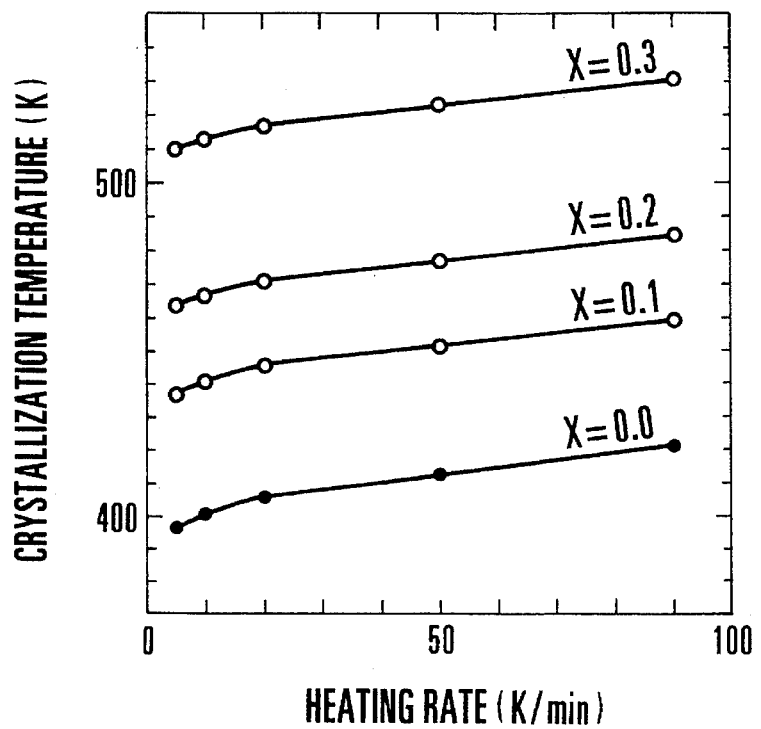
FIG. 10 is a graph showing the correlation between the heating rates and crystallization temperatures of the recording thin films shown in FIGS. 2A and 6 to 8 with respect to a difference in $Co_2Te_3$ content.

FIG. 10 is a graph showing the correlation between the heating rates and crystallization temperatures of the recording thin films shown in FIGS. 2A and 6 to 8 with respect to a difference in Co$_2$Te$_3$ content.

The crystallization temperature considerably increases with an increase in the Co$_2$Te$_3$ content. This indicates that these recording thin films have stability with respect to heat.

Figure 11:
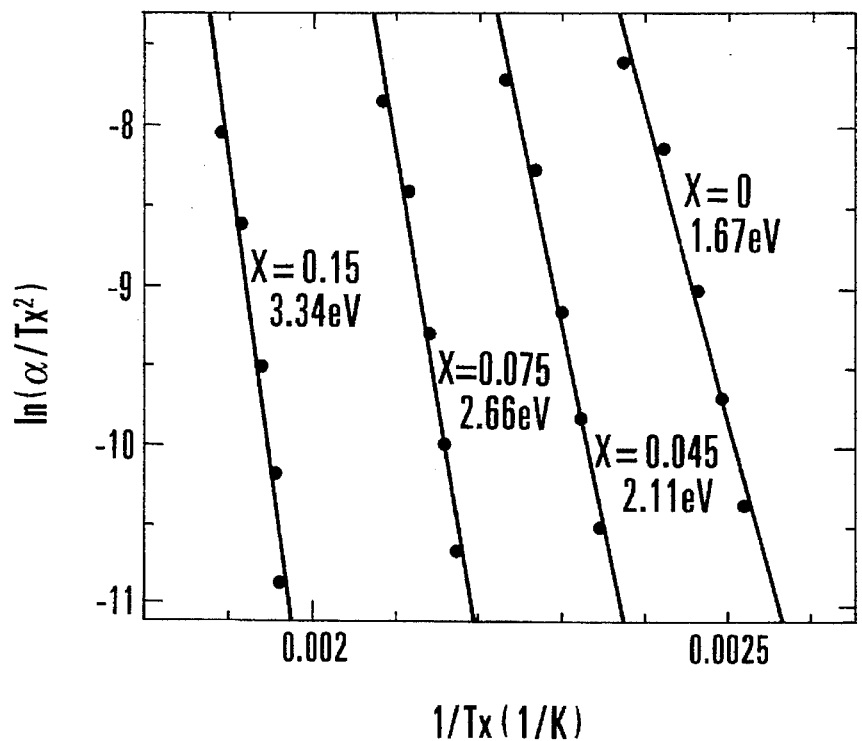
FIG. 11 is a graph, in which the heating rate dependence of crystallization temperatures is Kissinger-plotted, showing the correlation between the activation energies of the recording thin films when their Co contents increase.

FIG. 11 is a graph, in which the heating rate dependence of crystallization temperatures is Kissinger-plotted, showing the correlation between the activation energies of the recording thin films when their Co contents are increased.

The activation energies increase with increases in Co content, as indicated by x in FIG. 11. For example, when a Co content is zero, Sb$_2$Te$_3$ has an activation energy of 1.67 eV. When a Co content is 15 at %, $(Sb_2Te_3)_{0.85}Co_{0.15}$ has an activation energy of 3.3 eV.

The increase in activation energy means that the amorphous state of the recording thin film is stable.

More specifically, the recording thin film according to the present invention is more excellent than a conventional recording thin film in environmental resistance.

Figure 12:
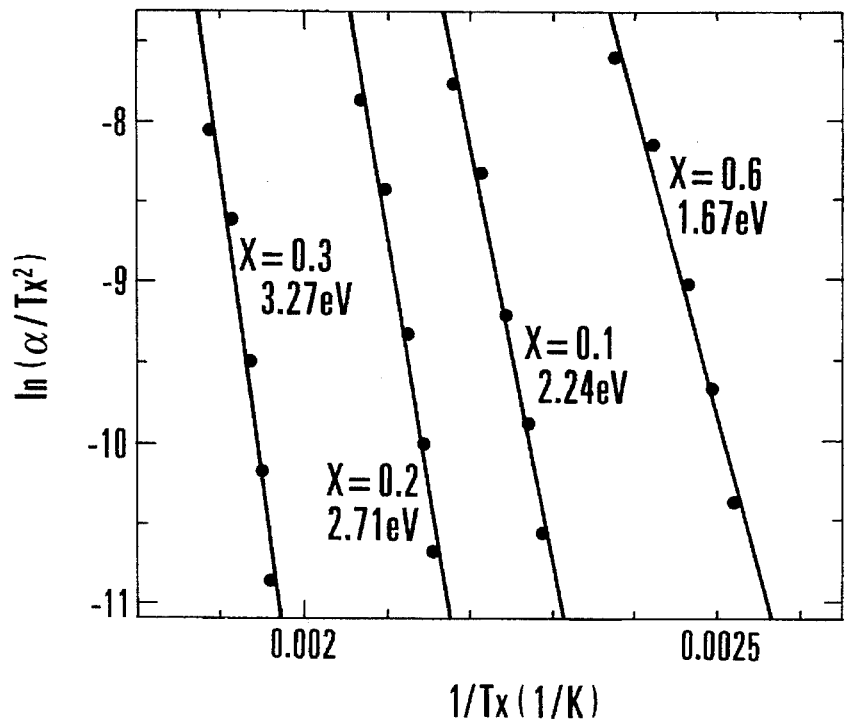
FIG. 12 is a graph, in which the heating rate dependence of crystallization temperatures is Kissinger-plotted, showing the correlation between the activation energy of $(Sb_2Te_3)_{1-x}(Co_2Te_3)_x$ when its $Co_2Te_3$ content increases.

FIG. 12 is a graph, in which the heating rate dependence of crystallization temperatures is Kissinger-plotted, showing the correlation between the activation energies of $(Sb_2Te_3)_{1-x}(Co_2Te_3)_x$ when its $Co_2Te_3$ content is increased.

As in the above-described case, the activation energy increases with an increase in $Co_2Te_3$ content.

The increase in activation energy, as described above, means that an amorphous state is stable. Therefore, it is understood that the recording thin film according to the present invention is excellent in environmental resistance.

As has been described above, according to the present invention, Co is added to an Sb-Te alloy which is conventionally used as the material of the recording thin film of an information recording medium. For this reason, a time required to crystallize the recording thin film can be shortened, and the stability of the amorphous state of the recording thin film can be improved.

In addition, when the content of Co to be added is changed, a crystallization rate can be freely adjusted.

Therefore, the information recording medium according to the present invention has, as merits, good recording/reproducing characteristics, a high sensitivity, and a stable recorded state.

What is claimed is:

1. An information recording medium comprising:

a recording thin film formed on a substrate, said recording thin film consisting of a material containing cobalt, antimony, and tellurium in one of the following relationships:

$(Sb_2Te_3)_{1-a}(Co_2Te_3)_a$ where $0<a<1$; and $(Sb_2)_{1-b}Co_b$ where $0<b<1$;

said recording thin film recording information in accordance with an energy beam irradiated thereon which changes optical characteristics of said recording thin film.

2. A medium according to claim 1, wherein a dielectric film for protecting said recording thin film is formed on an upper surface of said recording thin film.

3. A medium according to claim 2, wherein said dielectric thin film consists of an organic material.

4. A medium according to claim 2, wherein said dielectric film consists of an inorganic material.

5. A medium according to claim 2, further comprising a dielectric film formed between said substrate and said recording thin film.

6. A medium according to claim 2, further comprising a reflecting film formed on an upper surface of said dielectric film.

7. A medium according to claim 6, further comprising a protective film formed on said reflecting film.

8. A medium according to claim 1, wherein said recording thin film consists of $(Sb_2Te_3)_{1-a}(Co_2Te_3)_a$ ($0<a<1$).

9. A medium according to claim 1, wherein said recording thin film consists of $(Sb_2Te_3)_{1-b}Co_b$ ($0<b<1$).

* * * * *

UNITED STATES PATENT AND TRADEMARK OFFICE
CERTIFICATE OF CORRECTION

PATENT NO. : 5,492,794
DATED : February 20, 1996
INVENTOR(S) : Yoshitaka Kawanishi, et al.

It is certified that error appears in the above-indentified patent and that said Letters Patent is hereby corrected as shown below:

Col. 10, line 5, delete "$(Sb_2)$", insert --$(Sb_2Te_3)$--.

Signed and Sealed this

Eighteenth Day of June, 1996

*Attest:*

BRUCE LEHMAN

*Attesting Officer*  *Commissioner of Patents and Trademarks*